United States Patent [19]

Hoke

[11] Patent Number: 4,615,512
[45] Date of Patent: Oct. 7, 1986

[54] INTERNAL PRESSURIZED VEHICLE SUSPENSION STRUT ASSEMBLY

[75] Inventor: Roger E. Hoke, Dayton, Ohio

[73] Assignee: General Motors Corporation, Detroit, Mich.

[21] Appl. No.: 755,889

[22] Filed: Jul. 15, 1985

Related U.S. Application Data

[63] Continuation of Ser. No. 565,334, Dec. 27, 1983, abandoned.

[51] Int. Cl.$^4$ .......................... B60G 13/08; F16F 9/18; F16F 9/36
[52] U.S. Cl. ..................................... 267/8 R; 29/450; 267/64.19; 403/51
[58] Field of Search ................. 267/8 R, 64.16, 64.19, 267/64.21, 64.23, 64.24, 64.28, 8 B, 8 C, 8 D, 8 A, 9 R, 9 B, 9 A, 9 C, 10; 188/298, 315, 322.19, 322.21, 322.22; 280/668; 74/18.2; 92/98 R, 98 D; 403/50, 51; 29/450

[56] References Cited

U.S. PATENT DOCUMENTS

| | | | |
|---|---|---|---|
| 2,850,276 | 9/1958 | Jackson | 267/64.23 |
| 3,525,512 | 8/1970 | Hagwood | 267/64.16 |
| 3,558,154 | 1/1971 | Jackson | 280/714 |
| 3,603,574 | 9/1971 | Lutz | 267/8 R X |
| 3,945,663 | 3/1976 | Duckett | 267/64.19 X |
| 4,256,292 | 3/1981 | Sullivan, Jr. et al. | 267/8 R |

FOREIGN PATENT DOCUMENTS 180952  2/1955  Austria .................. 92/98 R Primary Examiner—Bruce H. Stoner, Jr.
Assistant Examiner—Richard R. Diefendorf
Attorney, Agent, or Firm—Charles R. White

[57] ABSTRACT

A vehicle suspension strut in which an internal elastomer sleeve is used as an air/oil separator bladder. Air pressure introduced to the chamber formed by the sleeve will expand the sleeve creating a pressure in the hydraulic fluid which acts on the area differential of the piston to create an adjustable lifting force for vehicle height control. Also as the strut works going into jounce, shock absorber oil displaced by the rod is taken up by the air volume trapped inside of the air sleeve. A main suspension spring is mounted to and around the reservoir tube of the strut which may be steerable.

4 Claims, 3 Drawing Figures

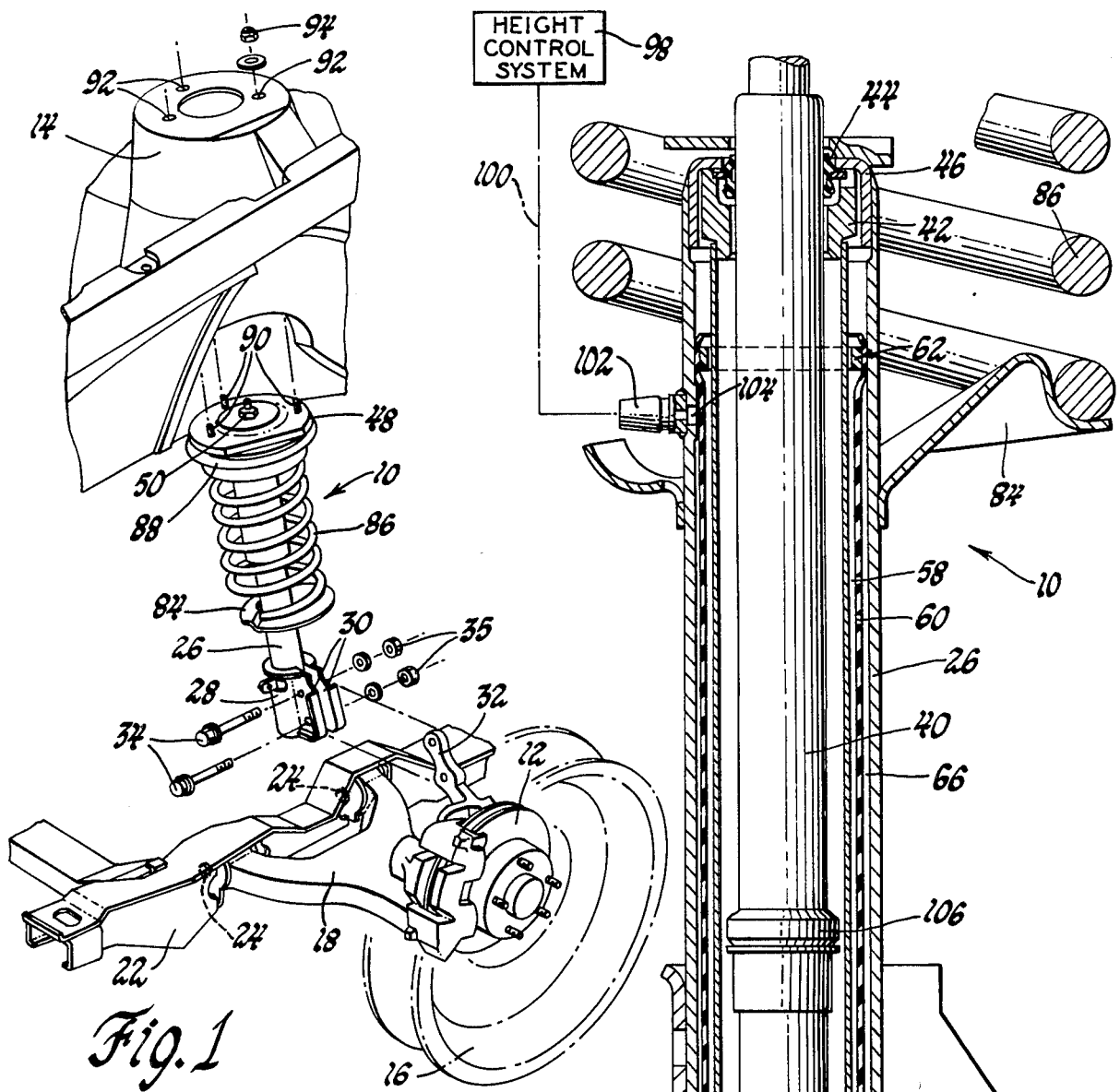
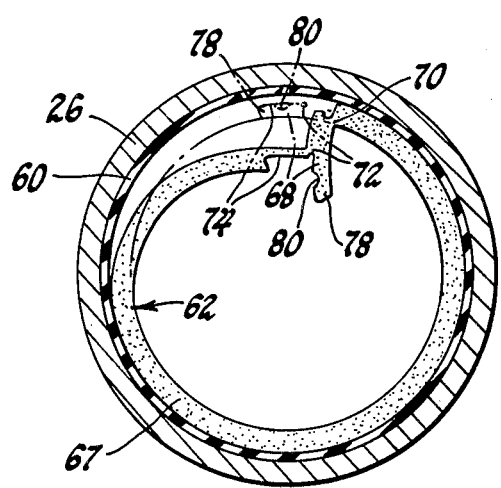
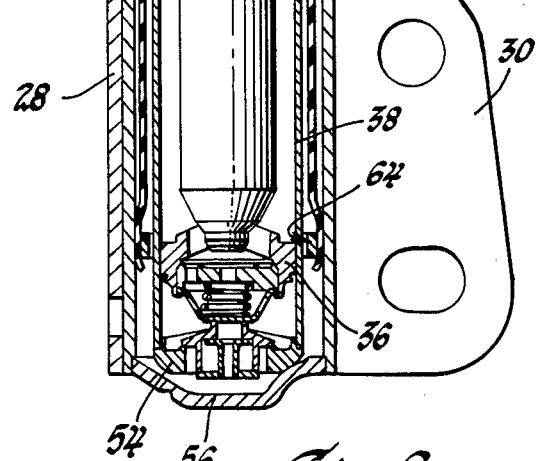

INTERNAL PRESSURIZED VEHICLE SUSPENSION STRUT ASSEMBLY

This is a continuation of application Ser. No. 565,334 filed on Dec. 27, 1983 now abandoned.

This invention relates to vehicle suspensions and more particularly to a new and improved pneumatically adjustable suspension strut having a discrete internal pneumatic chamber therein charged with pressurized gas which by way of the hydraulic fluid in the unit exerts an upward lifting force on the piston in the strut for vehicle height adjustment.

In this invention a new and improved suspension strut is provided with an internal cylindrical sleeve which is secured to the inner wall of the reservoir tube to form an internal air/oil separator bladder. This sleeve is a thin membrane preferrably molded or extruded from an elastomer that is impermeable to oil and which holds its size and shape and is fully operative in shock absorber oil over the life of the strut.

Internal and radially expandable retainers or clamps made from glass-filled nylon or other suitable materials can be used for assembly of the cylindrical elastomer sleeve to the internal wall of the reservoir tube of the strut. Since the sleeve can be installed through the open upper end of the reservoir tube and secured therein by the retainers, the elastomer sleeve is not exposed to weld heat used to close the lower end of the strut. These retainers also allow the elastomer sleeve to be removed and replaced if there is a bladder leak or if other service is required. As an alternative to the plastic inner retainers identified above, expandable metal clamps can be used with good results. Also, if desired, the upper and lower portions of the elastomer sleeve can be vulcanized to the internal wall of the reservoir tube to effect sealing and establishment of the bladder. In the preferred operation of this invention, pressure regulated from a suitable control system is introduced into the internal bladder through an external air fitting on the reservoir tube. This air pressure will vary the expansion of the inner sleeve of the bladder to selectively vary the pressure in the hydraulic fluid which acts upon the area differential of the side of the piston of the damper to create a variable lifting force on the vehicle body to which the piston rod is attached. A height control system dictates the pressurization of the bladder so that the trim height of the vehicle can be raised or lowered in accordance with set limits of the system. As the strut works in going into jounce and rebound, the rod area displacement is taken up by the air volume trapped inside of the bladder. Since the strut requires no other gas space to accommodate displaced oil on jounce, the oil chambers in the strut are completely filled and there is no intermixing of air and oil to cause frothing and poor damping performance These and other features, objects and advantages of this invention will be more apparent from the following detailed description and drawing in which:

FIG. 1 is an exploded isometric view of a suspension strut operatively mounted between the vehicle body and a road wheel assembly.

FIG. 2 is a vertical cross-sectional view of a portion of a suspension strut of FIG. 1 with some parts shown in full lines and with an added diagram.

FIG. 3 is a horizontal cross-sectional view of the reservoir tube of the strut illustrating the connection of an elastomeric bladder therein by internal circular retainers shown in a contracted or released position.

Turning now in greater detail to the drawing, FIG. 1 shows a steerable suspension strut 10 adapted to be operatively mounted between a wheel spindle and hub assembly 12 and a mounting tower 14 formed in the body work of a vehicle. The spindle and hub assembly 12 rotatably supports a pneumatic road wheel 16 and is in turn mounted on the outer end of a control arm assembly 18 by a conventional ball joint not shown. The control arm assembly 18 is pivotally mounted at its inboard end to the vehicle frame 22 by pivot shafts 24 for limited turning movements about a longitudinal axis extending through the pivot shafts.

The strut has a cylindrical outer reservoir tube 26 mounted at its lower end within a partially cylindrical mounting bracket 28 that has radially extending flanges 30 that are spaced from one another in side-by-side relationship to receive therebetween an upstanding arm 32 of the spindle and hub assembly 12. Threaded fasteners 34 extending through aligned openings in the mounting bracket flanges and arms 32 and threadedly receive nuts 35 to secure the reservoir tube in the support bracket 28.

The strut 10 incorporates shock absorber components therein which include a valved piston 36 reciprocally movable within an oil-filled cylinder tube 38 mounted within the reservoir tube 26. A tubular piston rod 40 extends upwardly from securement with the piston 36 through a rod guide 42 mounted in the upper end of the cylinder tube 38 and an annular elastomer seal 44 secured in the rod guide 42 by an upper end cap 46 secured by the crimped upper end of the reservoir tube 26. The piston rod extends upwardly into attachment with an upper mount 48 and is secured thereto by bolt 50 threaded on the end of the piston rod. This mount may be like the strut mount of U.S. Pat. No. 4,256,292 issued Mar. 17, 1981 to Sullivan et al assigned to the assignee of this invention and hereby incorporated by reference.

The lower end of the cylinder tube 38 has a base valve assembly 54 mounted therein which is seated on a lower end cap 56 of the strut that is secured to the reservoir tube 26. The base valve meters and controls the flow of oil between the interior of the cylinder tube 38 and a fluid reservoir 58 primarily formed between the cylinder tube 38 and an elongated cylindrical sleeve or bladder 60 molded or extruded from a suitable elastomeric material. The bladder 60 is firmly secured in an air-tight manner to the inner wall of the reservoir tube 26 by internal upper and lower retainers 62 and 64 to form a pneumatic chamber 66 therebetween.

The retainers 62, 64 are identical, one-piece annular bands of constant thickness and width which are fabricated from glass-filled nylon or other suitable material. These retainers are radially expandable to accordingly expand contacted portion of the bladder to provide the air-tight connection between the ends of the bladder and the internal wall of the reservoir. The bladder and the reservoir tube thereby forms a variable volume pneumatic chamber 66.

Each retainer has a main curved body portion 67 which comprises about 330° of the retainer when installed. The opposite ends of the main body portion of the retainer are interconnected with an arcuate locking arm 68 by live hinges 70 and 72. The main body portion has a recess 74 in the internal diameter thereof which receives the end 78 of the locking arm to provide a snap-in fit to firmly but releasably secure the retainer in its expanded circular locking configuration. The recess 80 in the locking arm 68 accommodates tooling so that a mechanic can effect quick release of the retainer by swinging the locking arm radially inwardly about live hinge 70 to retract the retainer to its released or contracted position shown in FIG. 3. Conversely, the retainer is mounted in the reservoir by suitable tooling by swinging the locking arm outwardly to the locked position. As shown in the locked position, FIG. 4, the retainer forms a continuous 360° locking member of constant width and thickness. Metallic circular retainers expanded by suitable tooling can be readily used in place of the retainers 62, 64 to secure sleeve 60 in place.

The reservoir tube 26 has a spring seat 84 secured thereto which mounts the lower end of the helical vehicle suspension spring 86. The upper end of the suspension spring is seated on the spring seat 88 of the upper mount. Attachment bolts 90 extend from the top plate of the mount 48 through openings 92 in the upper face of the mounting tower to receive nuts 94 which secure the upper mount to the vehicle body.

A height control system 98 such as that illustrated in the U.S. Pat. No. 3,558,154 issued Jan. 26, 1971 to Jackson and assigned to the assignee of this invention and hereby incorporated by reference is pneumatically connected to the bladder chamber 66 by pneumatic line 100, a fitting 102 connected to line 100 welded or otherwise secured to the reservoir tube and a radial air passage 104 extending through the wall of the reservoir tube to pneumatically connect the fitting to chamber 66.

When the vehicle level is lowered to such an extent that the control system is triggered, the pressurized air will be fed into the chamber 66 to exert a force on the oil within the strut. This force will be transmitted to an upward lifting force on the piston rod which will tend to lift the vehicle until a level height is attained. Conversely, if the vehicle has exceeded a predetermined height, the control system will reduce the pressure in the chamber 66 so that the lifting force is reduced until the vehicle body attains the desired level height. If desired, a manually activated control system can be used with this invention.

In addition to providing the level adjustment desired for maintaining vehicle height, the pressurized bladder serves as an enclosed gas chamber which deflects and reduces in volume to increase the reservoir volume as the strut telescopes together in jounce and the piston rod, traveling into the cylinder tube, displaces oil fed into the reservoir. On rebound, when the strut extends, the pressurized gas in the gas chamber 66 expands the bladder to accordingly reduce the reservoir chamber as the oil therein flows into the cylinder tube. Accordingly, with this construction, the strut is completely filled with oil and there is no air/oil intermixing causing frothing to diminish the effectiveness of shock absorber valving and the damping efficiency.

Element 106 carried on the piston rod is a conventional stop which contacts the lower extremity rod guide on rebound to cushion and limit rebound stroke.

While a preferred embodiment of this invention has been shown and described to illustrate the invention, other modifications will become more apparent to those skilled in the art. Accordingly, the scope of this invention is set forth in the following claims.

The embodiments of the invention in which an exclusive property or privilege is claimed are defined as follows:

1. A pneumatically adjustable suspension strut for controlling the height of a sprung body of a vehicle comprising an outer support tube, a suspension seat on said support tube, a helical suspension spring having a lower end mounted on said seat and having an upper end operatively connected to the body of said vehicle, a hydraulic damper with a cylinder tube having a hydraulic fluid therein operatively mounted in said support tube, a piston mounted for reciprocating movement in said cylinder tube, a piston rod attached to said piston and extending axially in said cylinder tube and through one end thereof, said support tube being disposed around said cylinder tube and cooperating therewith to form a reservoir having a hydraulic fluid therein, a sleeve of elastomeric material having opposite ends operatively connected to the internal wall of said support tube to form a pneumatically adjustable lift spring in parallel to said helical suspension spring, selectively manually lockable and releasable retainer means with a constant radius when locked for sealingly securing the upper and lower ends of said sleeve to the inner wall of said support tube to seal the ends of said sleeve so that a separate pneumatic chamber is formed between said sleeve and said support tube, and gas pressure supply and exhaust means to control the pressure in said pneumatic chamber so that said oil in said reservoir and cylinder tube is pressurized to exert a hydraulic lifting force on said piston rod and the body of the vehicle.

2. A pneumatically adjustable suspension strut for controlling the height of a sprung body of a vehicle comprising an outer support tube, a spring suspension seat on said support tube, a helical suspension spring having a lower end mounted on said seat and having an upper end connected to the body of said vehicle, a hydraulic damper with a cylinder tube having a hydraulic fluid therein operatively mounted in said support tube, a piston mounted for reciprocating movement in said cylinder tube, a piston rod attached to said piston and extending axially in said cylinder tube and through one end thereof and through said support tube into operative connection with said body, said support tube being a reservoir tube disposed around said cylinder tube forming a reservoir having a hydraulic fluid therein, a sleeve of elastomeric material having opposite ends operatively connected to the internal wall of said reservoir tube to form a discrete pneumatically adjustable lift spring in parallel with said suspension spring, selectively manually lockable and releasable upper and lower retainer means having live hinge means connecting parts thereof and having an outer sealing surface defining a circle of a constant radius when locked disposed within the confines of said sleeve for respectively sealingly securing the upper and lower ends of said sleeve to the inner wall of said reservoir tube to seal the ends of said sleeve so that an internal airtight pneumatic chamber is formed between said sleeve and said reservoir tube, and gas pressure supply and exhaust means to control the pressure in said pneumatic chamber so that said hydraulic fluid in said reservoir and cylinder tube is pressurized to exert a hydraulic lifting force on said piston rod and the body of the vehicle.

3. A pneumatically adjustable suspension strut for controlling the height of a sprung body of a vehicle comprising an outer support tube, a suspension spring seat secured to said support tube, a helical suspension spring mounted on said seat and extending around said tube into operative connection with the body of said vehicle, a hydraulic damper with a cylinder tube having a hydraulic fluid therein operatively mounted in said support tube, said support tube being connected to an unsprung portion of the vehicle, a piston mounted for reciprocating movement in said cylinder tube, a piston rod attached to said piston and extending axially in said cylinder tube and through one end thereof and through said support tube into connection with the sprung body of the vehicle, said support tube being a reservoir tube disposed around said cylinder tube and cooperating therewith to form a reservoir having a hydraulic fluid therein, a sleeve of elastomeric material in said reservoir to form a pneumatically adjustable lift spring separate from said reservoir and in parallel with said helical suspension spring, separate and discrete upper and lower selectively manually radially expandable and contractible retainer means said retainer means being of a plastics material having a live hinge and a lock associated therewith, said retainer means having a 360° outer sealing surface with a constant radius when locked and disposed inside of said sleeve for sealingly securing the upper and lower ends of said sleeve to the inner wall of said reservoir tube so that an airtight pneumatic chamber is formed between said sleeve and said reservoir tube, and gas pressure supply and exhaust means to control the pressure in said pneumatic chamber so that said hydraulic fluid in said reservoir and cylinder tube is pressurized to exert a hydraulic lifting force on said piston rod and the body of the vehicle attached thereto.

4. A pneumatically adjustable vehicle suspension strut comprising an outer support tube, a suspension spring seat mounted on said support tube, a helical suspension spring seated on said seat and extending upwardly therefrom into supporting connection with the body of the vehicle, a hydraulic damper having a cylinder tube adapted to be filled with a shock absorber fluid operatively mounted in said support tube, a piston mounted for reciprocating movement in said cylinder tube and having a piston rod extending axially in said cylinder tube and through one end thereof, said support tube being a reservoir tube disposed around said cylinder tube and defining a reservoir for shock absorber fluid, a cylindrical sleeve of elastomeric material disposed between the outer surface of said cylinder tube and the inner surface of said reservoir tube to form a separate pneumatic chamber, and separate upper and lower selectively radially expandable and contractible clamping means internal of said sleeve with a 360° outer sealing surface and with a constant radius for securing the opposite ends of said sleeve to the inner wall surface of said reservoir tube in a fluid-tight manner to thereby form an internal pneumatic chamber separated from the shock absorber fluid in said reservoir by said elastomeric sleeve, and control means to selectively pressurize said pneumatic chamber to provide a suspension spring force in parallel with said helical suspension spring.

* * * * *